United States Patent
Erringer

(10) Patent No.: US 10,097,645 B2
(45) Date of Patent: *Oct. 9, 2018

(54) METHOD AND APPARATUS OF PERFORMING PEER-TO-PEER COMMUNICATION ESTABLISHMENT AND CONNECTION CHANGE-OVER

(71) Applicant: KASEYA LIMITED, Dublin (IE)

(72) Inventor: Alan Erringer, Santa Barbara, CA (US)

(73) Assignee: KASEYA LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/490,693

(22) Filed: Apr. 18, 2017

(65) Prior Publication Data

US 2017/0223114 A1    Aug. 3, 2017

Related U.S. Application Data

(63) Continuation of application No. 15/051,074, filed on Feb. 23, 2016, now Pat. No. 9,628,569, which is a continuation of application No. 13/082,449, filed on Apr. 8, 2011, now Pat. No. 9,270,747.

(51) Int. Cl.
| | |
|---|---|
| G06F 15/173 | (2006.01) |
| H04L 29/08 | (2006.01) |
| H04L 12/26 | (2006.01) |
| H04L 29/06 | (2006.01) |

(52) U.S. Cl.
CPC ............ *H04L 67/148* (2013.01); *H04L 43/08* (2013.01); *H04L 67/104* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 5,530,701 A * | 6/1996 | Stillman | ............. | H04L 41/0803 370/410 |
| 6,122,514 A * | 9/2000 | Spaur | ............. | H04W 72/042 370/468 |
| 7,593,321 B2 * | 9/2009 | Galand | ............. | H04L 1/22 370/218 |
| 7,907,530 B2 * | 3/2011 | Froelich | ............. | H04L 45/12 370/238.1 |

(Continued)

*Primary Examiner* — Peling Shaw

(57) ABSTRACT

A method and apparatus of monitoring active data communication sessions and potential new connections is disclosed. One example method of operation may include identifying a data communications requirement of a first network device currently communicating via the first communications connection with a second network device, and transmitting a data test message over at least one of the existing first communications connection and the second communications connection. The method may also include receiving a response to the data test message, and determining a change-over from the first communications connection to the second communications connection would provide a more optimal data connection based on the identified data communications requirements of the first network device. Active data sessions are constantly being considered for a change-over by potential new data connections which may provide increased optimal data performance.

20 Claims, 6 Drawing Sheets

(56) References Cited

U.S. PATENT DOCUMENTS

2003/0012137 A1* 1/2003 Abdelilah ............... H04L 47/10
370/229
2006/0221995 A1* 10/2006 Berkman ............ H04L 12/5692
370/463

* cited by examiner

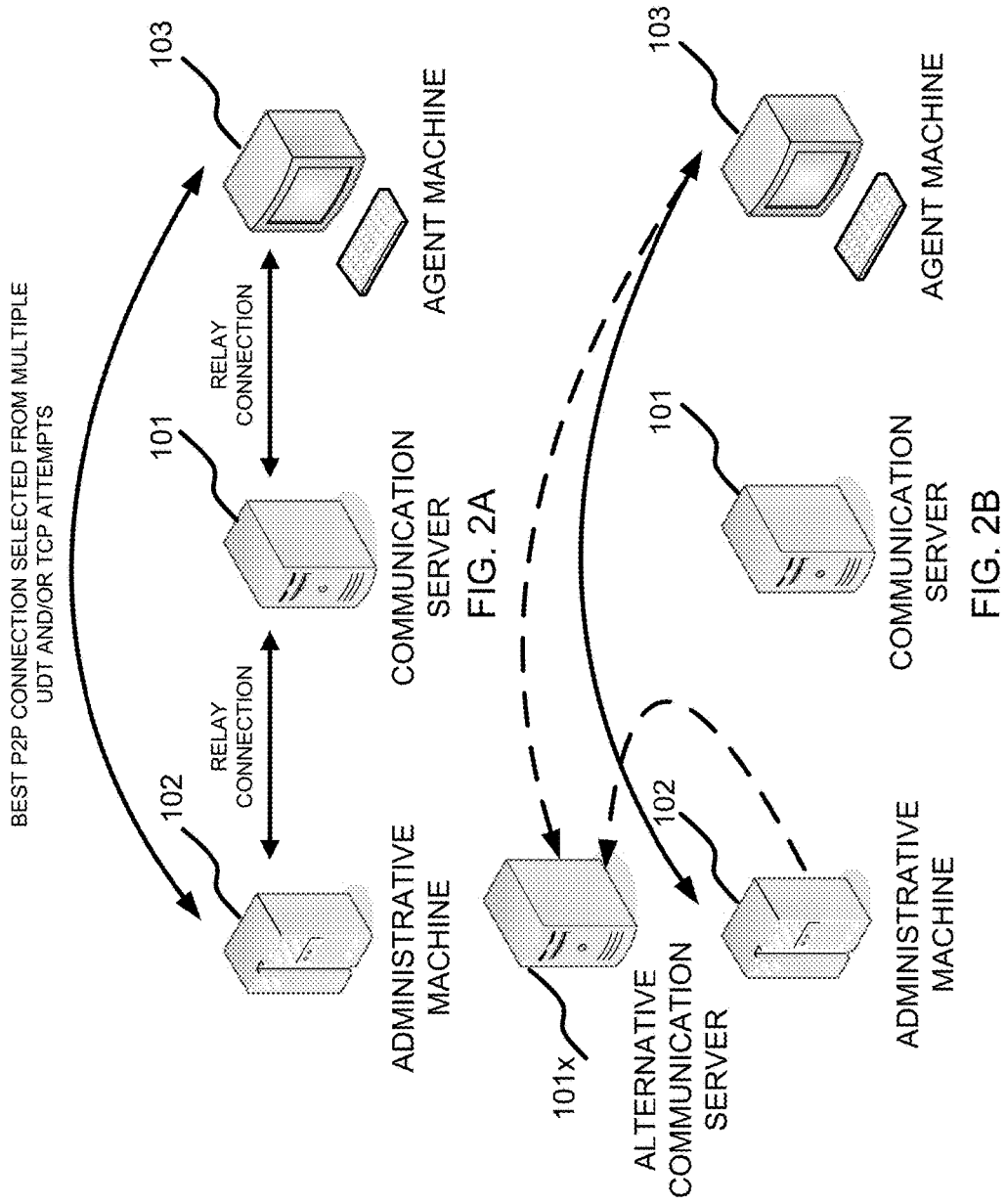

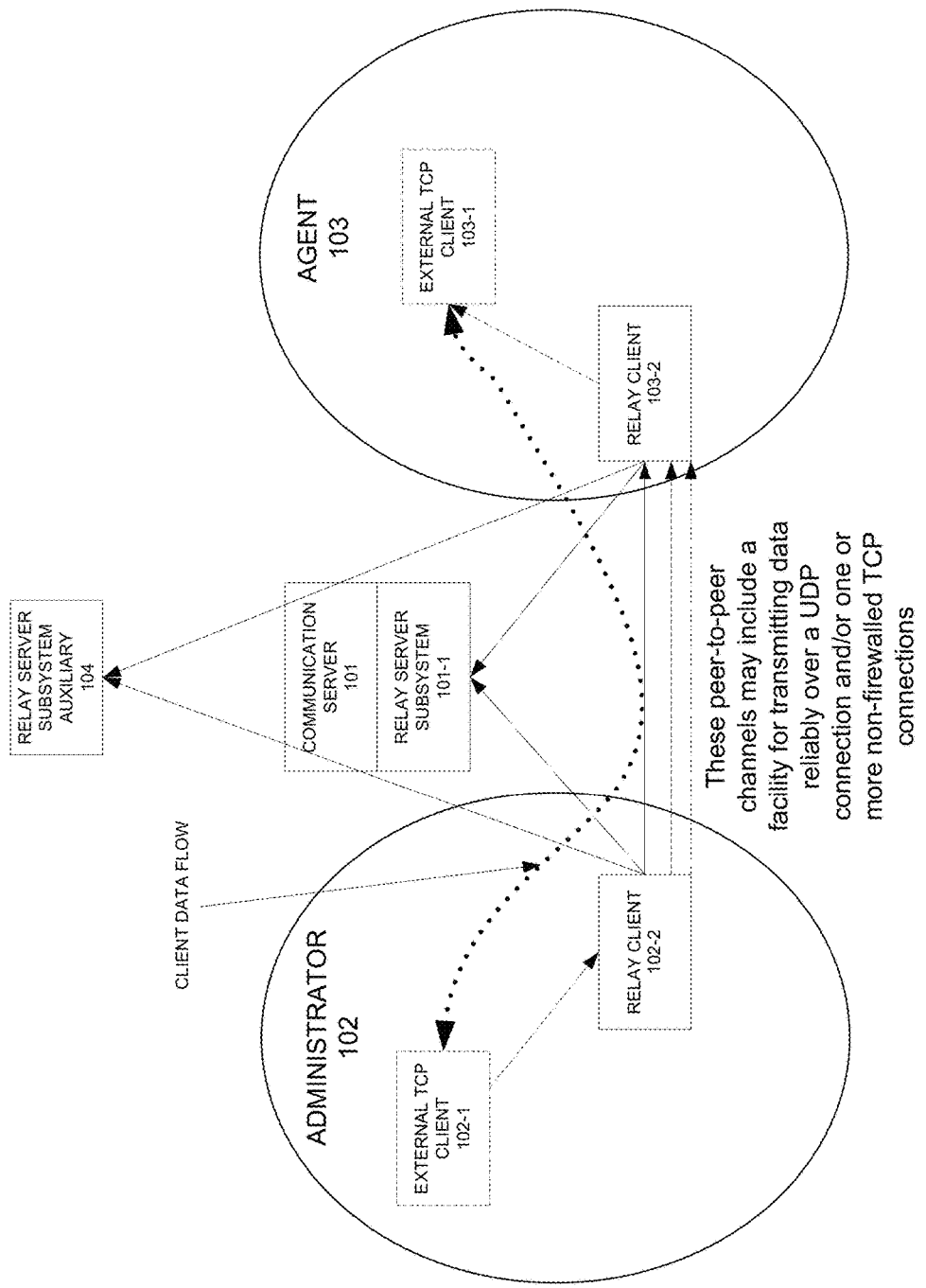

METHOD AND APPARATUS OF PERFORMING PEER-TO-PEER COMMUNICATION ESTABLISHMENT AND CONNECTION CHANGE-OVER

CROSS-REFERENCE TO RELATED APPLICATIONS

This application is a continuation of U.S. application Ser. No. 15/051,074, filed Feb. 23, 2016, entitled "METHOD AND APPARATUS OF PERFORMING PEER-TO-PEER COMMUNICATION ESTABLISHMENT AND CONNECTION CHANGE-OVER", issued U.S. Pat. No. 9,628,569, issued Apr. 18, 2017, which is a continuation of U.S. application Ser. No. 13/082,449, filed Apr. 8, 2011, entitled "METHOD AND APPARATUS OF PERFORMING PEER-TO-PEER COMMUNICATION ESTABLISHMENT AND CONNECTION CHANGE-OVER", issued U.S. Pat. No. 9,270,747, issued Feb. 23, 2016, the entire contents of which are incorporated by reference herein.

TECHNICAL FIELD OF THE INVENTION

This invention relates to a method and apparatus of establishing data communications in a peer-to-peer communication environment by implementing a user datagram protocol data transfer (UDP) protocol along with a transmission control protocol (TCP), and, to implementing a change-over procedure when more optimal data connections become available.

BACKGROUND OF THE INVENTION

A UDP-based data transfer may provide data communication. UDP may be configured to add reliability control and congestion control. UDP may also be configured to provide a high performance transfer interface to distributed data-intensive applications over a wide area network. In instances where TCP seldom operates efficiently, UDP may provide an alternative to data transfer. UDP can also be used in other situations where TCP is not suitable (e.g., multimedia streaming, firewall data transfers, partial reliability, etc.).

The flow of data traffic within communications networks is predominantly based on the proprietary transmission control protocol (TCP). UDP data flows can share the available bandwidth fairly, while accommodating TCP data traffic. UDP operates at the application level. UDP supports user-defined congestion control algorithms with simple setup configuration. Users may modify UDP to suit various situations. UDP is defined as the user datagram protocol (UDP), which makes it easier to traverse data firewalls. In addition, multiple UDP flows can share a single UDP port, which is advantageous since a firewall can usually only open one UDP port for all UDP connections present.

As indicated above, implementing the UDP protocol can increase data communication efficiency in certain circumstances, however, integration with UDP and proprietary TCP communication networking protocols presents challenges when implementing such hybrid protocol suites. Additionally, maintaining an optimal communication session may require periodic changes to the existing communication sessions and data connections.

SUMMARY OF THE INVENTION

One embodiment of the present invention may include a method of monitoring a first communications connection and a second communications connection in anticipation of performing a change-over. The method may include identifying a data communications requirement of a first network device currently communicating via the first communications connection with a second network device, and transmitting a data test message over at least one of the existing first communications connection and the second communications connection. The method may also include receiving a response to the data test message, and determining a change-over from the first communications connection to the second communications connection would provide a more optimal data connection based on the identified data communications requirements of the first network device.

Another example embodiment of the present invention may include an apparatus configured to monitor a first communications connection and a second communications connection in anticipation of performing a change-over. The apparatus may include a processor configured to identify a data communications requirement of a first network device currently communicating via the first communications connection with a second network device, and a transmitter configured to transmit a data test message over at least one of the existing first communications connection and the second communications connection. The apparatus may also include a receiver configured to receive a response to the data test message. The processor may further be configured to determine a change-over from the first communications connection to the second communications connection would provide a more optimal data connection based on the identified data communications requirements of the first network device.

BRIEF DESCRIPTION OF THE DRAWINGS

FIG. 2A illustrates an example network configuration of a P2P connection establishment, according to example embodiments of the present invention.

FIG. 2B illustrates an example network configuration of a change-over procedure, according to example embodiments of the present invention.

FIG. 3A illustrates an example detailed network configuration, according to an example method of operation of the present invention.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
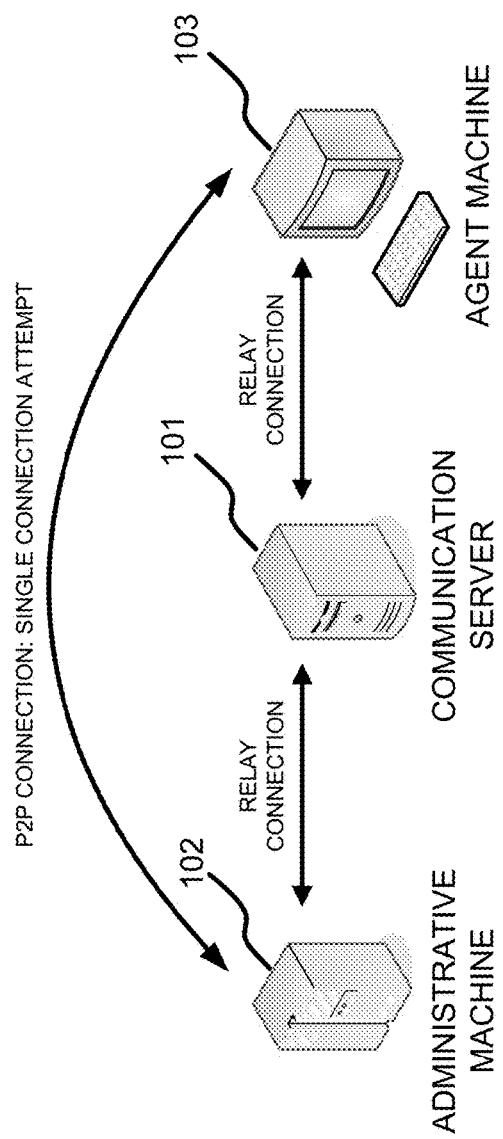
FIG. 1 illustrates an example network configuration, according to conventional configurations of the prior art.

FIG. 1 illustrates an example conventional communication network. Referring to FIG. 1, a communication server 101 is in communication with an administrative machine 102, which may be any of the computers or computing devices operating on the communication network. The communication network also includes an agent machine 103. Although, the physical configuration of FIG. 1 may also be similar to example embodiments of the present invention, the communication protocol signaling, connection establishment messages and/or other communication features follow conventional operations, which are different from the communication signaling of the present invention.

FIG. 2A illustrates an example communication network, according to example embodiments of the present invention. Referring to FIG. 2A, a communication server 101 is in communication with an administrative machine 102, which may be any of the computers or computing devices operating on the communication network. The communication network also includes an agent machine 103.

Referring to FIG. 2A, in operation, an initial connection is established between an administrative machine 102 and the agent machine 103 via the communication server 101. The communication server 101 may provide a connection between the administrative server 102 and the agent machine 103 by providing an initial communication channel required to exchange messages used to establish a P2P connection via rendezvous messages. Also, a live connect feature of the communication server 101 that becomes fully connected and fully functional may reduce the wait time observed from the user perspective.

FIG. 2B illustrates an example change-over procedure that may occur if a more optimized communication connection is discovered. Referring to FIG. 2B, after a connection has been established and a corresponding P2P session has been established, ongoing network audits may be performed to determine if more optimal connections are available. Such considerations used to determine an optimal connection may include bandwidth, latency, availability, etc. An alternative communication server 101x may be identified prior to attempting to establish a new connection. Change-over procedures and examples are discussed in further detail below.

In operation, the administrative machine 102 issues an HTTP request to the communication server 101 from a browser interface to connect to the agent machine 103. The HTTP request contains a session-ID uniquely identifying the session and an agent globally unique identifier (GUID) uniquely identifying the agent. In response to the request, the communication server 101 executes a script (for example, a "startKLC" script) on the specified agent machine 103. The agent machine 103 executes the script to download all necessary dynamic linked libraries (DLLs) from the communication server 101.

One of the downloaded DLLs may be the communications client, which is instructed to contact one or more relay servers via TCP, given a list of IP address/port pairs. The administrative machine 102 and agent machine 103 independently attempt to connect via TCP to one or more relay servers using the session-ID as a token used to identify the connection. When a relay server identifies both connections with the same session-ID it automatically associates those connections with one another. As a result, the relay server will receive messages from one client and forward them to the other transparently.

Negotiation of potential peer-to-peer routes takes place over this initial relay-mediated connection. Once the initial connection is established, the administrative server 102 and the agent machine 103 may exchange the local IP addresses of all network interfaces on the server by using rendezvous messages, which may be a first operation performed to establish a P2P connection. Additionally, it may be necessary for a connecting machine to have access to the public IP address/port pair (socket address) of the remote machine seeking access. A public socket address is a unique address that can be used to connect to the remote machine outside its private network. A network address translator (NAT) or firewall typically assigns a temporary public socket address automatically when a server sends network traffic out through the NAT or firewall to the public Internet.

Both machines 102 and 103 may attempt to discover their public socket addresses by querying a STUN server (not shown), which encapsulates the address into a rendezvous message and sends it to one of the servers. Each machine receives the rendezvous message from the other machine and tries to establish a connection with the socket address specified in the message. These addresses are exchanged through the existing TCP connections between communication server 101, the agent machine 103 and the administrative server 102.

In addition to the use of a STUN server to discover a public socket address, one or more of the servers may attempt to locate a responding universal plug and play (UPNP) device on the local network. The UPNP protocol allows a server to explicitly control NAT functionality on a network device. If such a device is discovered, the server requests a specific public port assignment. That assigned port is then supplied in the rendezvous message. If both servers have successfully received a rendezvous message from their counterparts, they will attempt to reach the other server's corresponding public address. Whether or not this connection attempt succeeds depends on the configuration of the NAT or firewall device in use.

If a peer-to-peer connection is established, all data is transferred between the agent machine 103 and the administrative machine 102 via the peer-to-peer connection. In other words, the initial relay connection used to share IP address information (rendezvous messages) is no longer used. The initial relay connection is a TCP connection between the administrative machine 102 and the agent machine 103 via the communication server 101. The P2P connection may provide increased scalability since the data is now exchanged directly between the administrative machine 102 and agent machine 103 and no longer requires the communication server 101 to send and receive messages. If a peer-to-peer connection could not be established, servers 102 and 103 may continue to use the relay mediated connection for the remainder of the session.

In general, one communication server 101 may serve as a communication medium for thousands of agents without experiencing overloading. In addition, since the connection is dedicated only for the exchange of data between the agent machine 103 and the administrative machine 102 there is an increased likelihood that the P2P connection will provide a more secure and efficient data connection than the relay connection provided via the communication server 101.

Another outcome of the established P2P connection is data optimization. For instance, once all possible connections speed and reliability have been measured, the most optimal connection may be selected as the best connection among the P2P connection. It is important to note that there can be more than one P2P connection and relay connection at any given time. The agent machine 103 may be operating under a software agent compatible with the communication server 101. The administrative server 102 may be any network machine that the administrator logs into as a virtual system administrator and manages the machines that are being monitored, such as, a monitored agent machine 103.

According to other example embodiments of the present invention, a peer-to-peer connection may be established using a hybrid TCP/UDP approach. In operation, an initial connection is established between the administrative server 102 and the agent machine 103. The communication server 101 may provide a connection between the administrative server 102 and the agent machine 103. Once the initial connection is established, if the initial rendezvous attempt was not successful, additional rendezvous attempts may be made using any additional local interfaces on the server (e.g., network cards). An attempt may be made to connect to one or more of the available interfaces to transmit establishment requests to each remote interface identified from the reception of the rendezvous message. For example, local interfaces of the agent machine 103 (1, 2) (not shown) may transmit a connect message to each of the remote interfaces (A, B, C) (not shown) of the administrative machine 102. The connection establishment may be symmetric, such that each of the remote interfaces attempts to connect to each of the local interfaces.

Every connection attempt may be performed on an independent thread using the TCP and UDP protocols. For example, each connection attempt for a TCP connection may be performed by establishing a connection attempt thread designated to attempt TCP connections over the communication network of FIG. 2. In connecting the agent machine 103 with the administrative server 102, the administrative server 102 may use the socket address it received as part of the rendezvous message exchanged between the agent machine 103 and the administrative server 102.

The first connection attempt that is deemed a successful connection may be used as the peer-to-peer connection between the administrative server 102 and the agent machine 103. Once a peer-to-peer connection is established, all data is transferred between the agent machine 103 and the administrative machine via the peer-to-peer connection. In other words, the initial relay connection used to share information and setup the connection attempt is no longer used.

Alternatively, the most reliable and/or most efficient connection may be deemed the actual connection that is used. Simultaneous connection attempts may be performed by a thread designated to attempt connections over UDP. The UDP connection attempts may be performed by executing threads that determine a "BestRouteFound." In general, the connection that is established first over the TCP and UDP attempts will be the selected connection, however, additional considerations may be made before selecting a connection, such as, reliability, history, predetermined preferences, etc.

Example embodiments of the present invention may also provide a TCP multiplexer function, which provides multiple independent modules (clients) to establish TCP connections locally to a connected entity. Connection requests are transmitted over the above-described communications channels to a similar remote instance, which connects to a TCP service module residing on the remote server. Once connected, messages received on the local entity are transmitted transparently to the remote instance and vice versa. Many such clients and corresponding services may be connected simultaneously and independently.

When establishing a UDP connection, a machine, such as, an agent machine 103 sends a request to connect to a remote machine, such as, an administrative machine 102 or vice versa. The remote machine responds by sending an acknowledgement message. Once the initiator of the request receives the acknowledgement response, the UDP protocol operates by designating the connection to be used. The agent machine 103 may send a UDP connection request to the administrative machine 102 by transmitting a connection request from each interface and vice versa. For example, if the agent machine 103 has two interfaces (1, 2) and the administrative machine 102 has three interfaces (A, B, C), then the combination of the various interfaces may yield 6 connection requests (2 agent interfaces×3 administrative interfaces), however, the result may yield fewer (i.e., one) connections then connection attempt messages transmitted.

After a P2P connection is established, a change-over may be requested and confirmed via communication between the administrative machine 102, the communication server and/or the agent machine 103. For example, once the P2P establishment algorithm determines a new connection is more optimal than the one currently being used for data transfer, a change-over may be performed to use the better connection for data transfer. It is a mutual agreement between the agent machine 103 and administrative machine 102 to use the new established connection for all communications.

Communications networks vary in their performance characteristics. For instance, they may be responsive in terms of low-latency end-to-end response, but may not sustain continuous high bandwidth data transfer channels. Conversely, although they may transfer high bandwidth data efficiently, they may incur a large end-to-end delay. In addition, their performance characteristics may vary over time. The clients vary in their requirements for low-latency (perceived real-time responsiveness) or overall bandwidth (efficient bulk data transfer). A screen sharing client is an example of a client application requiring good real-time performance, though minimal data is actually exchanged. Conversely, a file transfer client is an application which requires high bandwidth but is not as sensitive to end-to-end latency.

FIG. 3A illustrates an example communication network with added detail to indicate the client modules within the network devices. Referring to FIG. 3A, the administrator server 102 and the agent machine 103 communicate through the communication server 101. The administrator 102 includes an external TCP client 102-1 and a relay client 102-2. The agent 103 includes an external TCP client 103-1 and a relay client 103-2. The communication server 101 also includes a relay server subsystem 101-1 that communicates with the relay clients 102-2 and 103-2.

A relay server auxiliary subsystem 104 may also be used to support the relay connection prior to or contemporaneous with the communication server 101 connection. The relay server auxiliary subsystem 104 may be one of possibly several auxiliary relay servers available in the communication network. The client data flow is indicated as flowing from the administrative server 102 and the agent 103 via the client connections. In operation, the communication server 101 may setup a connection, however, the communication server 101 is otherwise not part of the communication session between the administrative server 102 and the agent 103. The peer-to-peer connections illustrated in FIG. 3A may be based on a UDP connection and/or one or more non-firewalled TCP connections.

During the course of a client communication session, one or more client or client modules on the administrative machine 102 may desire to establish a TCP session with a peer server on agent machine 103 using the existing system as a communications medium. In order to prepare for establishing a connection to the peer, a software API would be invoked indicating what the preferred throughput profile is for the client, whether it be a low-latency or high bulk data transfer requirement, or both requirements, etc.

The communication system of FIG. 3A combines the requirements of its current set of clients to determine whether the preferred bandwidth profile is low-latency or high throughput. The system also examines average packets inbound vs. average packets outbound to determine whether to execute a change-over decision based on average measured inbound bandwidth or outbound bandwidth.

Figure 3B:
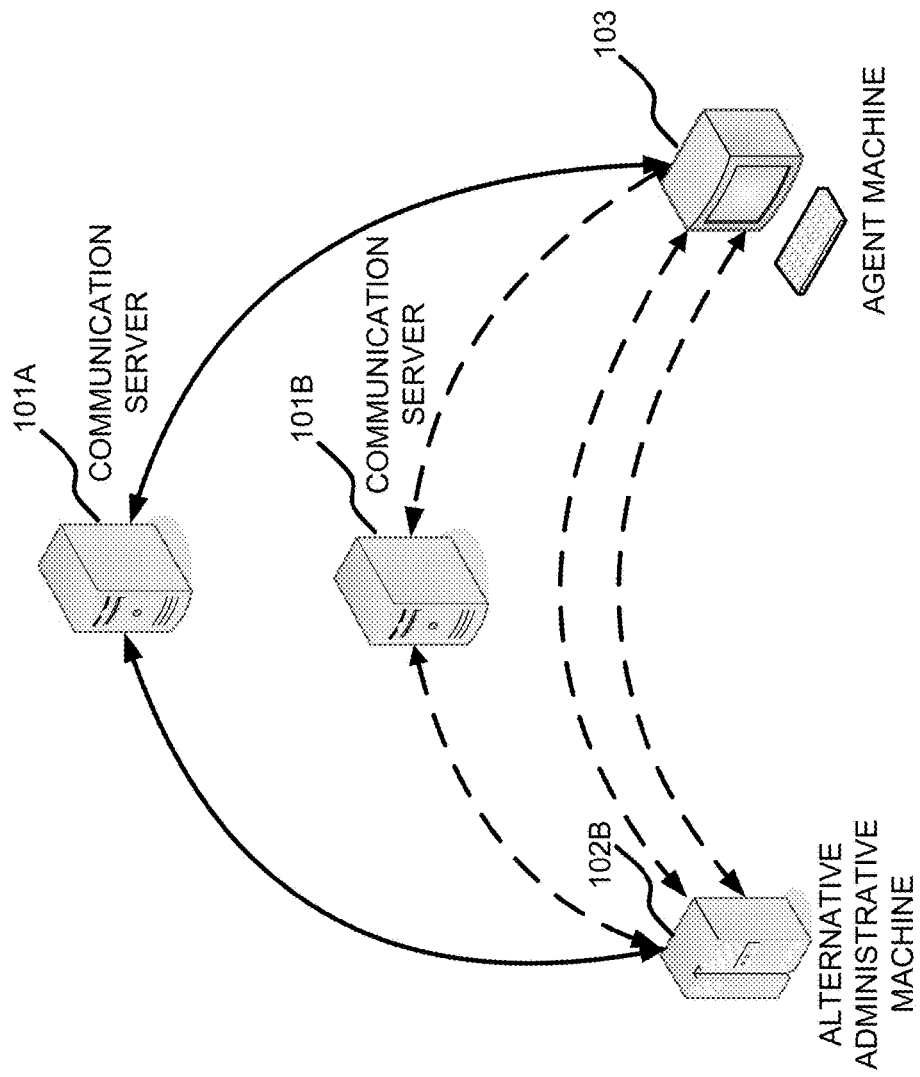
FIG. 3B illustrates another example detailed network configuration, according to an example method of operation of the present invention.

FIG. 3B illustrates a communication system according to another example embodiment of the present invention. Referring to FIG. 3B, the established channels may include one or more relays configured with TCP, P2P-TCP and/or UDP. During the communication over the established channels, other channels are periodically evaluated as indicated by the dotted lines, a 'best' channel may be observed during the evaluation cycle and selected via a changeover procedure.

The changeover may include selecting the best of several parallel channels between the same two endpoints, these channels may be p2p or relay-mediated. In the changeover procedure there are generally only two endpoints involved (agent machine 103 and alternative administrative machine 102B), however, there may be multiple relays implemented between two endpoints and only one 'application' embodied in several 'communication servers' 101A and 101B.

In order to determine whether a change-over is appropriate the agent machine 103 monitors all the active connections and continuously, at intervals, measures data speed (bandwidth (Bps)). The measurements attempt to characterize each connection in terms of a predominant data direction, level of latency and bulk transfer rate. If a determination is made that a new connection would perform with increased optimization based on a tested connection, as compared to the current connection being used, a change-over decision may be affirmed.

In order for a change-over to occur, average measured bandwidth over an interval of several tests must exceed the current connection bandwidth in the same dimension by a percentage threshold to avoid constant disruption. Such a change-over may include sending a message to the agent machine 103 that all subsequent communication will be performed on this new connection. In response, the agent machine 103 sends a response to the agent machine 102 "OK" or "ACK" that it is acceptable to use the established connection. The response from the agent machine 103 completes the change-over. After this response, all messages between the agent machine 102 and agent machine 103 are exchanged on the new connection.

During the course of an initial connection establishment procedure, a connection may be selected after a best connection is identified. The first established peer-to-peer connection is automatically selected as the preferred connection by default. The preferred connection may be established by identifying an agent's requirements or service requests. An immediate change-over from the initial relay connection is performed once the selected peer-to-peer connection is discovered and identified as a potential candidate connection. Subsequently, bandwidth and network performance tests determine the best connection and whether any change-over is needed for increased optimal performance of the data transfer.

When a communication session is established between the administrator 102 and the agent 103, the IP address and port of one or more relay servers 104 is provided to both the administrator 102 and agent machines 103. The administrator 102 and agent 103 independently attempt to connect via TCP to each of the servers 101 and/or 104 using the session ID as a token to identify the connection. When a relay server 104 views both a 'listen' and a 'connect' connection having the same token identifier, it associates them and will receive messages from one client and forward them to the other client transparently. Negotiation of potential peer-to-peer routes take place over the initial relay-mediated connection.

The various connections that may be active once the setup phase has completed may include one or more of non-firewalled TCP connections, a UDP connection, and a relay-mediated connection. If the agent 103 and the administrator 102 are located on the same network subnet, then there could be two or three TCP connections established as well as a UDP connection, in addition to the initial relay connection. For a connection through a firewall, a relay connection and a UDP connection may be used. A session may include one to ten different connections for data transfer and signaling.

Once a first connection is established, the administrator 102 communicates to the agent 103 via connections of various types on various interfaces, all of which are used to communicate to the same peer device. In order to maintain an active session, 'keepalive' messages may be used to maintain active acknowledgements for a period of 10 seconds. If a 'keepalive' message is not received and/or acknowledged a predefined number of times (e.g., three times) in a particular time period, a connection may be dropped for want of a more efficient connection.

Additional tests may be utilized, such as, a periodically (every 10 seconds) sent bandwidth test message. Such a test message may be sent to one of the peers of the session, which is immediately returned over the same connection. For a latency test, a small message may be sent to measure round-trip delay. For the bulk data test, several (8) large (2000 byte) messages may be used to confirm data integrity and bandwidth. The test messages may be transmitted over both the existing connection and the potential new candidate connection and compared to verify which connection provides a more optimal data channel. Alternatively, test messages may be only sent over the new candidate connection and compared to previously recorded data test message results of the first communications channel.

In order to measure an outbound data rate (Bps), the time from sending the message to the arrival of the received first message may be used as a proxy for the outbound data rate (Bps). Also, a measure from the first message received to the end of the last packet received provides an indication of an inbound bandwidth rate (Bps). A rolling window of samples (e.g., last 10) may be maintained to provide an average during each change-over consideration (every 30 seconds).

Once an opportunity has been discovered to perform a change-over procedure, the administrative machine 102 may make change-over determinations from bandwidth test messages it exchanges with the agent machine 103. Communication server 101 may operate as a mere reflector, in the context of the communications channel. The administrative machine 102 will ultimately perform the change-over, but the change-over attempt may fail due to a timeout or a failure to receive a required message. The change-over may be an automated feature performed seamlessly from the agent's perspective.

During negotiation of a change-over, messages are taken from the current connection in both directions before the messages are sent over the new connection. Negotiation completes or fails before messages flow over the new connection or fall back to the old one. The old connection stays up and active and is tested for its bandwidth characteristics, and remains a candidate for a change-over. TCP and/or UDP may be used for the peer-to-peer connections. For example, TCP may be used from the relay-mediated connections. Re-testing and re-evaluating are constantly performed over the duration of the active session. A minimum threshold of difference in performance parameters between the measured data of the new candidate connection and the previous connection (e.g., 10%, 20%, etc.) is required to avoid unnecessary or trivial jumping of connections. In order to setup a secure connection, all messages may be encrypted using 256 bit AES.

Figure 4:
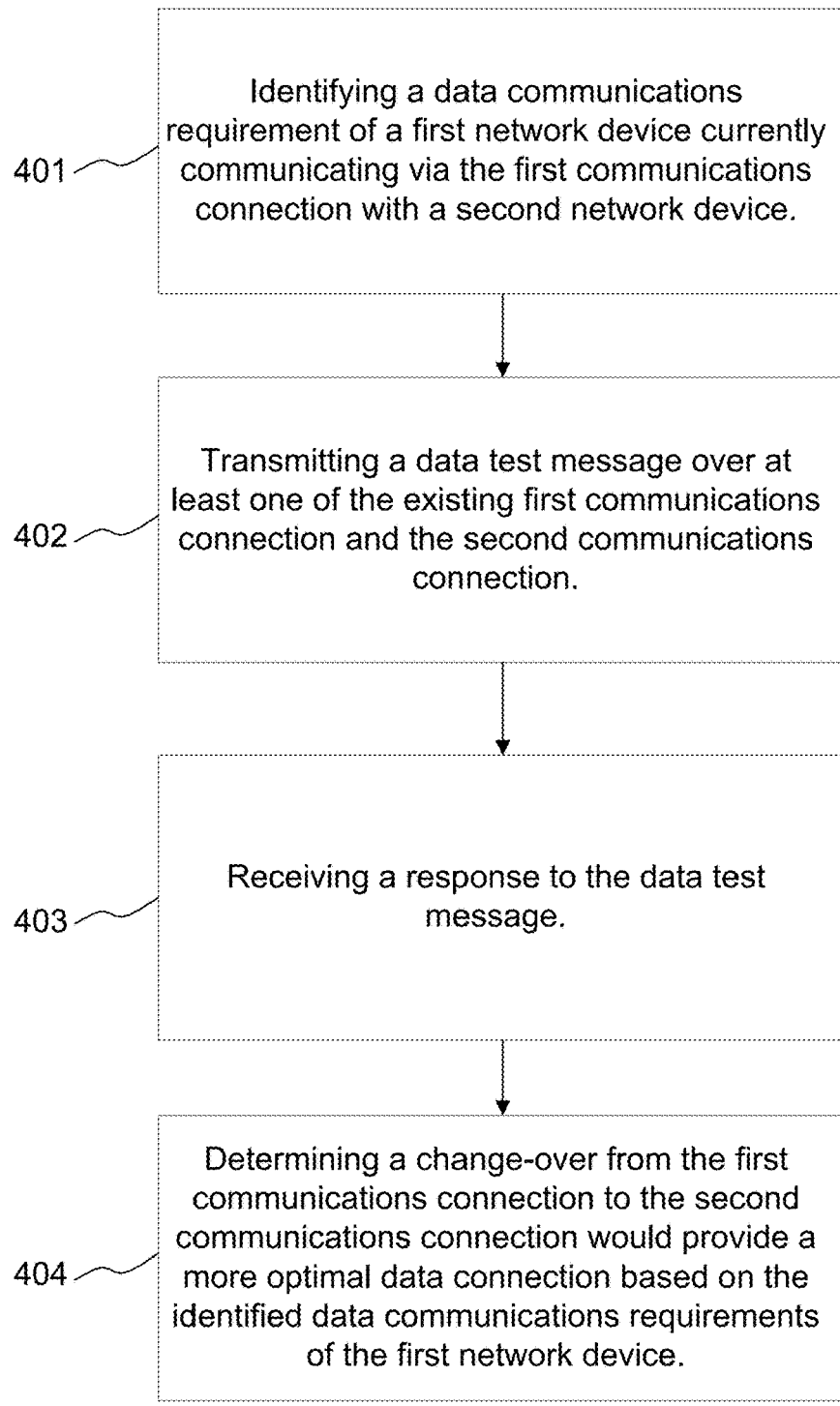
FIG. 4 illustrates an example flow diagram, according to an example method of operation of the present invention.

One example method of operation is illustrated in the flow diagram of FIG. 4. Referring to FIG. 4, a method of monitoring a first communications connection and a second communications connection in anticipation of performing a change-over is illustrated. The method may include identifying a data communications requirement of a first network device currently communicating via the first communications connection with a second network device, at operation 401. The method may also include transmitting a data test message over at least one of the existing first communications connection and the second communications connection, at operation 402. The method may also provide receiving a response to the data test message, at operation 403 and determining a change-over from the first communications connection to the second communications connection would provide a more optimal data connection based on the identified data communications requirements of the first network device, at operation 404.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components 101, 102 and 103.

Figure 5:
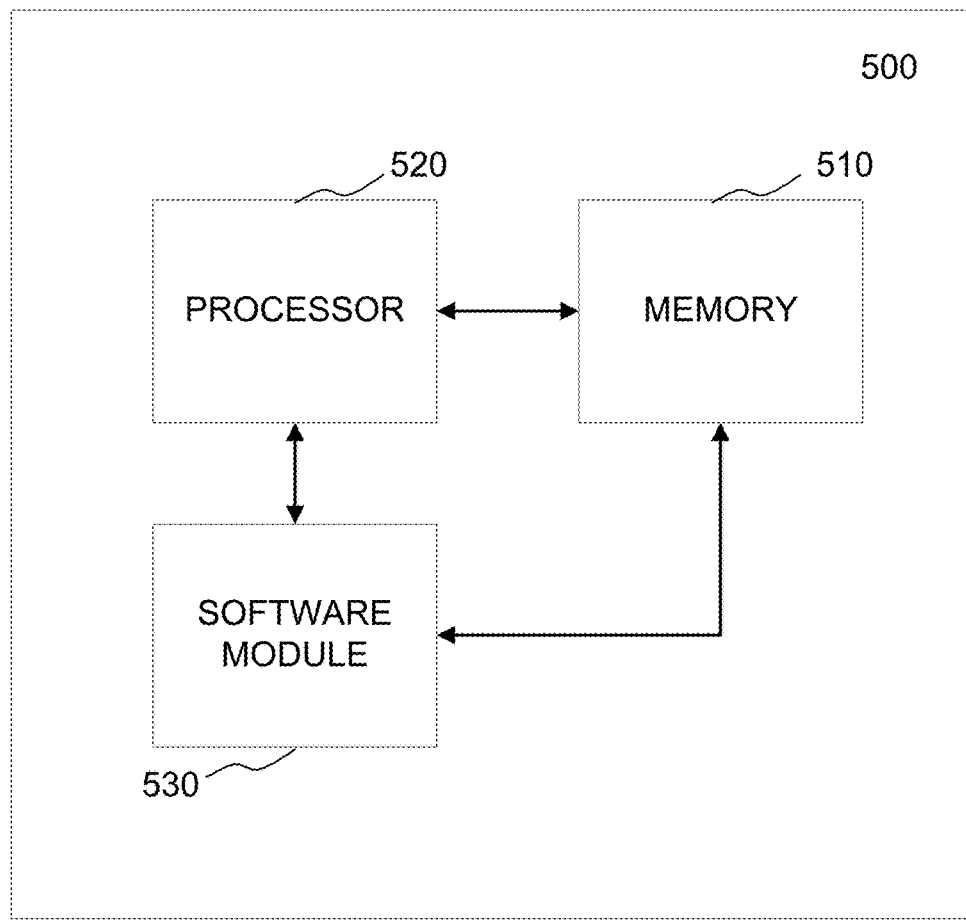
FIG. 5 illustrates an example network entity device configured to store instructions, software, and corresponding hardware for executing the same, according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    receiving a response to a data test message from a first network device, communicating via a second communications connection, to a second network device;
    comparing the response to previously measured test data associated with a first communications connection between the first network device and the second network device;
    determining an average measured connection bandwidth exceeds a current connection bandwidth of the first communications connection by a predefined percentage threshold; and
    determining a change-over from the first communications connection to the second communications connection would provide a more optimal data connection based on the comparing and the predefined percentage threshold being exceeded.

2. The method of claim 1, wherein the first communications connection and the second communications connection are peer-to-peer data connections.

3. The method of claim 1, further comprising identifying the data communications requirement of the first network device, wherein the identifying the data communications requirement of the first network device comprises determining at least one of a latency rate and a data rate.

4. The method of claim 1, comprising transmitting the data test message from the first network device, wherein the transmitting comprises transmitting at least one of a bandwidth test message and a latency test message.

5. The method of claim 1, further comprising changing an existing data communications session between the first network device and the second network device from the first communications channel to the second communications channel.

6. The method of claim 1, wherein the comparing determines which of the first and the second communications connections provides a more optimal data connection.

7. The method of claim 1, wherein data communications between the first communications device and the second communications device are changed from the first communications channel to the second communications channel if a difference between the response to the test data message provides test data that is more optimal than the previously measured test data by a minimum threshold of difference.

8. An apparatus, comprising:
a receiver configured to receive a response to a data test message from a first network device, in communication via a second communications connection, to a second network device;
wherein the response to the data test message is compared to previously measured test data associated with a first communications connection between the first network device and the second network device; and
a processor configured to:
determine an average measured connection bandwidth exceeds a current connection bandwidth of the first communications connection by a predefined percentage threshold, and
determine a change-over from the first communications connection to the second communications connection would provide a more optimal data connection based on the comparison and the predefined percentage threshold being exceeded.

9. The apparatus of claim 8, wherein the first communications connection and the second communications connection are peer-to-peer data connections.

10. The apparatus of claim 8, wherein the data communications requirement of the first network device comprises at least one of a latency rate and a data rate.

11. The apparatus of claim 8, wherein the data test message comprises at least one of a bandwidth test message and a latency test message.

12. The apparatus of claim 8, wherein the processor is further configured to change an existing data communications session between the first network device and the second network device from the first communications channel to the second communications channel.

13. The apparatus of claim 8, wherein the comparison determines which of the first and the second communications connections provides a more optimal data connection.

14. The apparatus of claim 8, wherein data communications between the first communications device and the second communications device are changed from the first communications channel to the second communications channel if a difference between the response to the test data message provides test data that is more optimal than the previously measured test data by a minimum threshold of difference.

15. A non-transitory computer readable storage medium comprising instructions that when executed cause a processor to perform:
receiving a response to a data test message from a first network device, communicating via a second communications connection, to a second network device;
comparing the response to previously measured test data associated with a first communications connection between the first network device and the second network device;
determining an average measured connection bandwidth exceeds a current connection bandwidth of the first communications connection by a predefined percentage threshold; and
determining a change-over from the first communications connection to the second communications connection would provide a more optimal data connection based on the comparing and the predefined percentage threshold being exceeded.

16. The non-transitory computer readable storage medium of claim 15, wherein the first communications connection and the second communications connection are peer-to-peer data connections.

17. The non-transitory computer readable storage medium of claim 15, comprising instructions that when executed cause the processor to perform identifying the data communications requirement of the first network device, wherein the identifying the data communications requirement of the first network device comprises determining at least one of a latency rate and a data rate.

18. The non-transitory computer readable storage medium of claim 15, comprising instructions that when executed cause the processor to perform transmitting the data test message from the first network device, wherein the transmitting comprises transmitting at least one of a bandwidth test message and a latency test message.

19. The non-transitory computer readable storage medium of claim 15, wherein the comparing determines which of the first and the second communications connections provides a more optimal data connection.

20. The non-transitory computer readable storage medium of claim 15, wherein the data test message is transmitted over the second communications connection and the response to the data test message is compared to previously measured test data associated with the first communications connection to determine which of the first and second communications connections provides a more optimal data connection.

* * * * *